Figure 1:
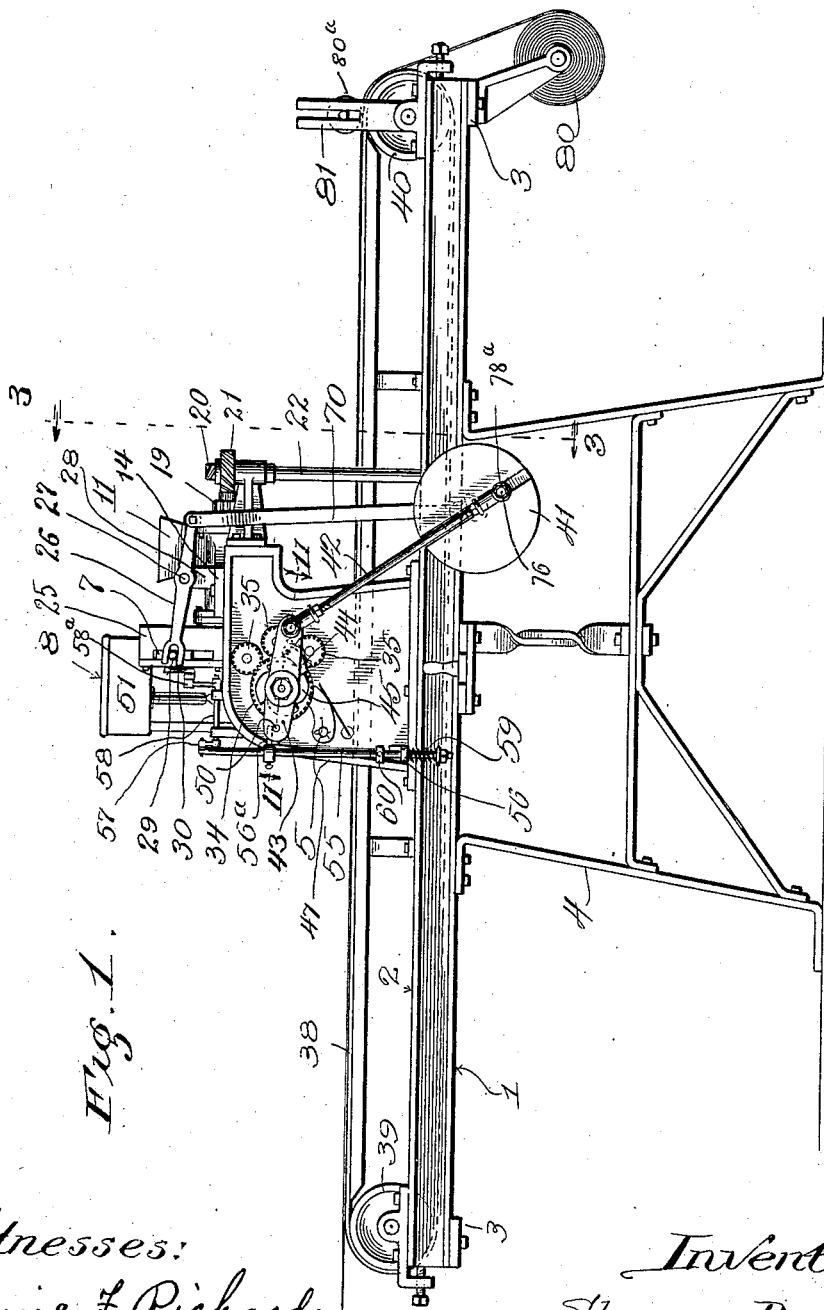

S. POOLEY.
CONFECTIONERY MACHINERY.
APPLICATION FILED JUNE 26, 1908.

918,195.

Patented Apr. 13, 1909.
4 SHEETS—SHEET 2.

Fig. 2.

Witnesses:
Fannie F. Richards
Frank W. Bemmm

Inventor:
Speero Pooley,
by Charles C. Shewey
his Atty.

S. POOLEY.
CONFECTIONERY MACHINERY.
APPLICATION FILED JUNE 26, 1908.
918,195.
Patented Apr. 13, 1909.
4 SHEETS—SHEET 3.
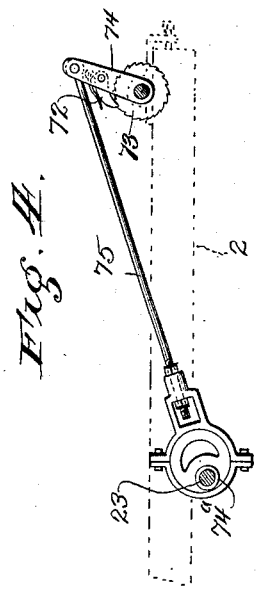
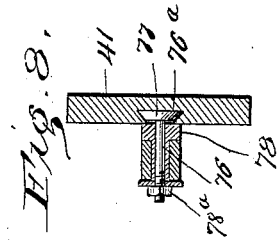
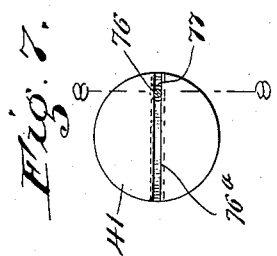
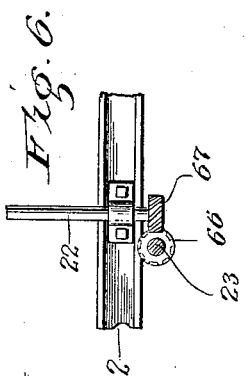
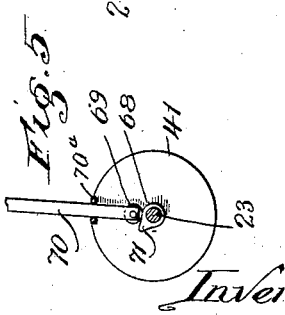
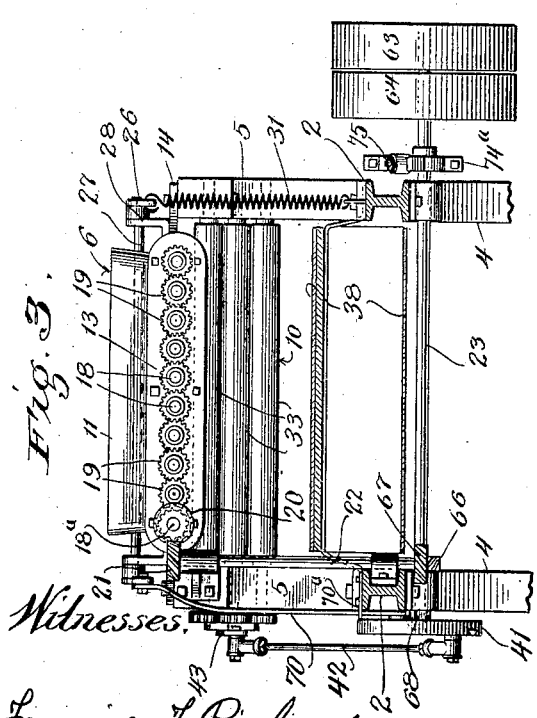
Inventor
Speero Pooley,
by Charles O. Shurway
his Atty.

S. POOLEY.
CONFECTIONERY MACHINERY.
APPLICATION FILED JUNE 26, 1908.
918,195.
Patented Apr. 13, 1909.
4 SHEETS—SHEET 4.
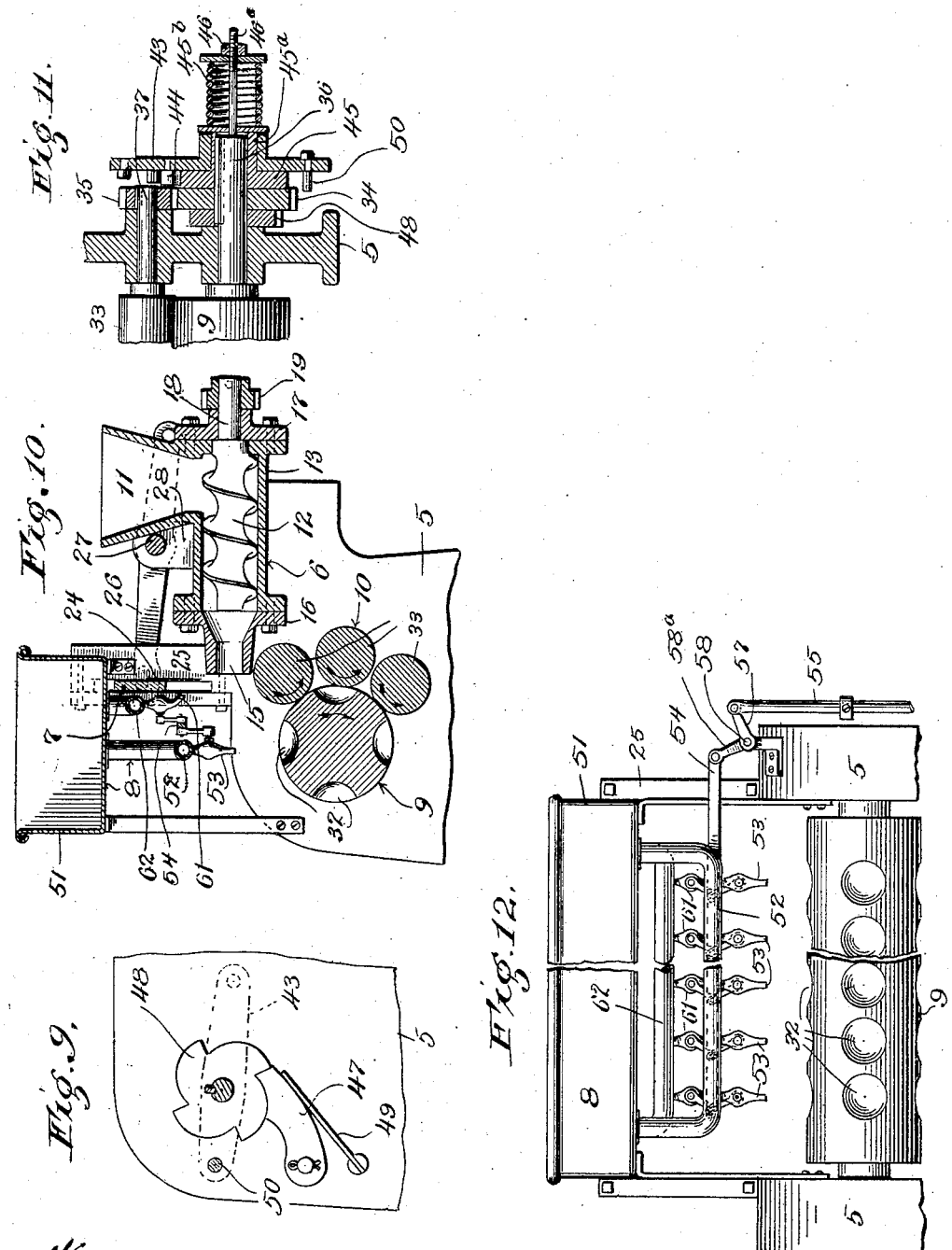

UNITED STATES PATENT OFFICE.

SPEERO POOLEY, OF CHICAGO, ILLINOIS.

CONFECTIONERY MACHINERY.

No. 918,195.　　　　　Specification of Letters Patent.　　　Patented April 13, 1909.

Application filed June 26, 1908. Serial No. 440,562.

*To all whom it may concern:*

Be it known that I, SPEERO POOLEY, a citizen of the United States, residing at Chicago, in the county of Cook and State of Illinois, have invented new and useful Improvements in Confectionery Machinery, of which the following is a full, clear and exact description.

This invention relates to improvements in confectionery machinery and designs to provide a machine for cutting candy stock into small blocks and molding said blocks into shape. The form shown in the drawings has been especially designed for producing candies of hemispherical form, although it is obvious that other shapes may be formed by the machinery. The invention consists in the several novel features of construction, combination and arrangement of parts, a description of which will be found in the following specification and the essential features more particularly pointed out in the claims.

The invention is clearly illustrated in the drawings furnished herewith in which—

Figure 1 is a side elevation of a machine embodying my improvements. Fig. 2 is a plan view thereof with certain lubricating mechanism removed, to illustrate parts which would otherwise be hidden from view. Fig. 3 is a vertical cross section taken on line 3—3 Fig. 1. Fig. 4 is a detail side view of certain mechanism for advancing a conveyer belt. Fig. 5 is a detail side view of a knife operating cam and parts adjacent thereto. Fig. 6 is a side view of part of the gearing between the main drive shaft and a vertical shaft. Fig. 7 is a side view of a crank wheel. Fig. 8 is a detail cross section taken on line 8—8 Fig. 7. Fig. 9 is a detail view of certain stop mechanism for the shaping roll. Fig. 10 is a detail longitudinal section taken on line 10—10 Fig. 2. Fig. 11 is a detail section taken on the line 11—11 Fig. 1, and Fig. 12 is an end view of the lubricating mechanism.

In these views 1, represents the main frame, which as shown comprises two longitudinal bars 2, cross bars 3, and legs 4. These parts may be constructed in any suitable manner to provide a substantial supporting frame for the operating parts of the machine. Two standards 5, are mounted upon the bars 2, between which standards are located the candy feeding mechanism 6, the cutting knife 7, the lubricating devices 8, the shaping roll 9 and compressor rolls 10.

The feeding mechanism is best seen in Figs. 2, 3 and 10, and as shown, comprises a hopper 11, for receiving the candy stock, and a plurality of suitably driven feed worms 12, for feeding the stock to the shaping roll 9. The feed worms are arranged longitudinally of the machine and are journaled in a casing 13, which is supported upon the standards 5, by flanges 14, which are bolted or otherwise secured to the standards. The hopper extends across the top of the worms and delivers the stock thereto, and they convey it through the casing 13, to discharge orifices 15, at the front end thereof. The casing has two end pieces 16, 17, which are secured upon the main body of the casing and form the front and rear walls thereof, the orifices 15, being formed in the end piece 16, as shown. The worms are provided with stud shafts 18, that are journaled in bearings in the end piece 17, and said stud shafts have intermeshing pinions 19, mounted upon their exposed ends. The threads of the worms are right and left handed and the intermeshing pinions cause the adjacent worms to turn in inverse directions, thereby forcing the candy stock toward the discharge orifices 15. The shaft 18$^a$ of the end worm bears a pinion 20, which is driven by a pinion 21, upon a vertical shaft 22, which is driven from the main drive shaft 23, of the machine.

The cutting mechanism 7, is provided for cutting up the stock, which is delivered from the discharge orifices, into small blocks, and these blocks fall into shaping pits on the face of the shaping roll. The cutting mechanism comprises a knife 24, which is slidingly mounted in posts 25, that project up from the standards 5, and said knife is carried by oscillating levers 26, mounted upon a cross shaft 27, which is journaled in brackets 28. The levers 26, are connected with the knife as for instance by means of pins 29, upon the knife which rest in the forked ends 30, of the levers, and said levers are rocked by a cam upon the main drive shaft 23. A spring 31 secured to one of the levers 26, raises the knife after it has been depressed by the cam.

The shaping roll is journaled in the standards and has a plurality of pits or sockets 32, upon its periphery, which pits are in alinement with the discharge orifices. These pits or sockets may be of any desired shape, but for the purpose of making certain confections are spherical in form, as shown. Upon one side of the shaping roll is a presser for crowding the blocks of stock into the pits and giving to them their proper form or contour. As shown the preferred form of presser comprises a plurality of rolls 33, journaled in the standards and bearing upon the shaper roll. These rolls are geared to move in unison with the shaper rolls, by means of intermeshing gears 34, and 35, secured upon the stud shafts 36, 37, of the rolls 9, 33. The rolls rotate in the directions indicated by the arrows in Fig. 10, and the stock which lodges in the pits is consequently forced into the pits by the rolls 33, as the pits pass by the rolls. After passing the lowermost roll the stock is free to drop out of the pits and falls upon a conveyer belt 38, which passes around a pair of rollers 39, 40, one of which is intermittently rotated so as to advance the belt one step at a time, thereby moving the finished confections from beneath the shaping roll after they have fallen upon the belt.

The rolls are intermittently rotated by suitable mechanism which is preferably driven from the main shaft, and as shown said mechanism comprises a crank wheel 41, upon the main drive shaft 23, a link 42, pivoted thereon, a rocker lever, 43, connected to the link and a pawl 44, pivoted upon the rocker lever 43, and engaging a ratchet 45 mounted upon the shaft 36, of the roll 9. As shown in the drawings the shaping roll has four rows of pits 32, and the ratchet 45, is correspondingly provided with four teeth for engagement with the pawl 44. In the form shown the rocker lever 43, is oscillated back and forth once during each complete revolution of the drive shaft, thereby advancing the shaping roll one step at the time.

The rocker lever 43, is pivoted upon a sleeve 45$^a$, of the ratchet 45, and a tension spring 45$^b$ is interposed between the sleeve and a nut 46, threaded upon the end of a spindle 46$^a$, which projects out from shaft 36. By tightening up the spring friction is applied to the roll and it is prevented from being accidentally turned by the upward swing of the rocker lever 43.

To insure the discharge of the finished confections from the pits I provide an abutment arm 47, which lies in the path of a toothed wheel 48, which is provided upon the shaft 36, of the shaper roll and is struck by the shoulders of the wheel at the instant that the rocker lever 43, reaches the limit of its pulling stroke, thereby jarring the roll and shaking the confections out of the row of pits which has passed by the presser rolls. As shown the arm 47, is pivoted upon the standard 5, and is yieldingly pressed into contact with the toothed wheel 48, by a spring 49. A pin 50, upon the rocker lever 43, is arranged to swing the arm 47, out of engagement with the toothed wheel 48, thereby permitting the roll to be turned by the pawl 44. As soon as the pawl begins to move the ratchet wheel, the pin 50, is swung back from the arm 47, and the latter swings upon the toothed wheel and is struck by the oncoming tooth.

To further insure the discharge of the finished confections from the pits, I provide a lubricating device which is arranged to drop a little water or other suitable liquid into the rows of pits as they reach the highest point on the roll. As shown a tank 51, is supported upon the standards 5, and has a discharge pipe 52, extending below it, into which is screwed a plurality of pet cocks 53, one for each pit in the row. The handles of the pet cocks are connected by a bar 54, which is reciprocated back and forth each time that a new row of pits reaches the top of the roll. The means for reciprocating the bar 54, comprises a vertical rod 55, guided in a bracket 56, and reciprocated by the rocker lever 43. The rod 55, has a laterally extending pin 56$^a$, which lies in the path of the pin 50, and is raised thereby each time that lever reaches the limit of its pulling stroke. The upper end of the rod connects with an arm 57, fast upon a shaft 58, and said shaft bears a second arm 58$^a$, which connects with the bar 54. The vertical reciprocation of the rod 55, is thus converted into a horizontal reciprocation of the bar 54. A spring 59, upon the lower end of the rod 55, retracts the rod and a sleeve 60, upon the rod limits its downward movement. If desired the knife may be lubricated by pet cocks 61, secured upon a discharge pipe 62, and operated by the bar 54, which pipe is connected to the tank 51. If desired the pipes 52, 62, may be connected with any other source of water supply, as for instance the city pressure.

The main drive shaft bears tight and loose pulleys 63, 64, and a belt shifter 65, is provided for shifting the driving belt from one pulley to the other. The drive shaft bears a gear 66, which meshes with a gear 67, upon the lower end of the shaft 22. Rotation of the shaft 23, rotates the shaft 22, through the gears 66, 67, and the shaft 22, in turn imparts a rotary motion to the feed worms 13, through the gears 21, 22. The drive shaft bears a cam 68, for reciprocating the knife and said cam engages with a roller 69, journaled upon the lower end of a bar 70, guided in a bracket 70$^a$ the upper end of which rod is connected with one of the levers 26. The cam has a point 71, which raises the bar 70, and the cam is so set that the knife will be actuated immediately after the shaping roll has come to a position of rest.

The pulley 40, is intermittently rotated by a pawl and ratchet mechanism 72, 73, the pawl of which is carried by an arm 74, which is connected to an eccentric 74$^a$, by a rod 75. The eccentric is driven by the drive shaft 23, and oscillates the arm 74, back and forth once during each revolution of the drive shaft, consequently advancing the conveyer belt 38, one step each time that the shaping roll is moved.

A roll of paper 80, is supported upon the frame and the end passed over the belt 38, and under a roll 80ª, supported in posts 81 above the pulley 40. The roll 80ª, rests upon the paper and as the belt moves along, it unwinds the paper from the roll and carries it along with it. The candies fall upon this paper thus making it comparatively easy to remove them from the belt.

Figs. 7 and 8, illustrate mechanism for altering the length of the stroke of the crank pin 76, of the crank wheel 41. As shown the wheel 41, is provided with a dovetailed groove 76ª, across its face, in which groove is secured the head 77, of the crank pin 76. A sleeve 78, surrounds the crank pin and bears against the crank wheel and a nut 78ª, threaded upon the pin. By screwing the nut upon the pin the latter will be clamped in place in the dovetailed groove.

If for any reason it is desired to increase or decrease the number of rows of pits in the roll 9, it will be necessary to adjust the mechanism which turns the roll so that it will operate to bring a row of pits into place each time that the knife is reciprocated. This is accomplished by increasing or decreasing the throw of the crank pin 76, on the crank wheel 41. The effect of the change of position of the crank pin is that the rocking lever 43, is rocked to a greater or lesser extent and consequently the roll is turned correspondingly.

In operation the candy is poured into the hopper 11, and the feed worms force it out through the orifices 15. Rotation of the drive shaft imparts to the rocker arm 43, an oscillatory movement, which arm in turn transmits an intermittent rotary motion to the shaping and compression rolls and as the rolls come to a position of rest the water is turned on by the lubricating device, and the knife is lowered, severing the projecting pieces of stock, the severed pieces falling into the pits. The knife is then raised and the rolls advanced one step, carrying the pieces between them and pressing the pieces into the pits, the finished confections dropping out of the lowermost row of pits and falling upon the belt, which is subsequently advanced one step.

I realize that more or less variation of the parts are possible without departing from the spirit of my invention, and I do not therefore desire to limit myself to the exact forms shown and described except as may be necessitated by the state of the art.

I claim as new and desire to secure by Letters Patent:

1. In a device of the class described, the combination of a stock feeding device having a plurality of discharge orifices and mechanism for continuously discharging a plurality of bars of stock from said orifices, a reciprocable knife for cutting off blocks of stock from said bars, a suitably operated shaping roll having a cylindrical face provided with depressions therein, said depressions being arranged in alinement with the orifices of the feeding mechanism, so as to receive the blocks of stock after they are severed from the bars, and a smooth compressor bearing upon the shaping roll.

2. In a device of the class described, the combination of a stock feeding device having a plurality of discharge orifices and mechanism for continuously discharging a plurality of bars of stock from said orifices, a reciprocable knife for cutting off blocks of stock from said bars, an intermittently rotated shaping roll having a cylindrical face provided with depressions therein, said depressions being arranged in alinement with the orifices of the feeding mechanism, so as to receive the blocks of stock after they are severed from the bars, and a smooth co-acting compressor bearing upon the shaping roll for packing the stock into the depressions.

3. In a device of the class described, the combination of feeding mechanism having a plurality of discharge orifices for discharging a plurality of bars of stock, a suitably operated knife for cutting off blocks of stock from said bars, an intermittently rotated shaping roll having a plurality of pits on its surface which are arranged to receive the blocks of stock after they are severed from the bars, and a plurality of smooth compressor rolls rolling upon the surface of said shaping roll to pack the material into the pits.

4. In a device of the class described, the combination of a feeding device having a plurality of discharge orifices for discharging a plurality of bars of stock, a suitably operated knife for cutting off blocks of stock from said bars, an intermittently rotated shaping roll having a plurality of pits on its surface which are arranged to receive the blocks of stock after they are severed from the bars, and a series of smooth compressor rolls rolling upon the surface of said shaping roll and geared thereto so as to move in unison therewith.

5. In a device of the class described, the combination of feeding mechanism having a plurality of discharge orifices for discharging a plurality of bars of stock, suitably operated cutting mechanism for cutting off blocks of stock from said bars, a suitably operated shaping roll having pits upon its surface which are arranged to receive the blocks of stock after they are severed from the bars, a compressor roll rolling upon the surface of the shaping roll and a conveyer belt for conveying away the product as it falls from the compressor roll.

6. In a device of the class described, the combination of feeding mechanism having a plurality of discharge orifices for discharging a plurality of bars of stock, suitably operated cutting mechanism for cutting off blocks of stock from said bars, a suitably operated shaping roll having pits upon its surface which are arranged to receive the blocks of stock after they are severed from the bars, a compressor roll rolling upon the surface of the shaping roll, a conveyer belt and mechanism for intermittently advancing said conveyer belt.

7. In a device of the class described, the combination of feeding mechanism, having a plurality of discharge orifices for discharging a plurality of bars of stock, suitably operated cutting mechanism for cutting off blocks of stock from the bars, an intermittently rotated shaping roll having a plurality of pits in its surface for receiving the blocks of stock after they are cut from the bars, compressor rolls coöperating with said shaping roll and an intermittently advancing conveyer belt arranged to receive the product from the shaping roll.

8. In a device of the class described, the combination of driving mechanism, feeding mechanism having a plurality of discharge orifices for discharging a plurality of bars of stock, a shaping roll having rows of alined shaping pits on its surface, arranged in alinement with said discharge orifices and adapted to receive blocks of stock therefrom, a lubricating device having individual discharge orifices for each pit in the row, and means for opening and closing said orifices, including connections with the driving mechanism, for discharging a quantity of liquid into the pits.

9. In a device of the class described, the combination of feeding mechanism having a plurality of discharge orifices for discharging a plurality of bars of stock, a shaping roll having a plurality of pits in its surface, arranged in alinement with said discharge orifices and adapted to receive blocks of stock therefrom, a suitably operated rocker lever for imparting to said roll an intermittent rotary movement, lubricating mechanism having a plurality of pet cocks for discharging a quantity of the lubricating liquid into the pits, a bar connecting the handles of said pet cocks and a connection between said bar and the rocking lever for actuating said bar.

10. In a device of the class described, the combination of a shaping roll having pits in its periphery, a smooth compression roll, rolling upon the surface of said compression roll, gearing between said rolls for causing them to turn in unison, mechanism for feeding individual strips of stock to said rolls, a suitably operated knife for cutting said strips into blocks, a suitably driven crank wheel, and connection between the crank wheel and shaping roll for imparting an intermittent rotary movement thereto.

11. In a device of the class described, the combination of a shaping roll, compressor rolls coöperating therewith, gearing between said shaping and compressing rolls, feeding devices for feeding stock to said shaping rolls, a suitably operated rocker arm for imparting intermittent rotary movement to said rolls, and a movable stop mechanism for jarring said shaping roll.

12. In a device of the class described, the combination of feeding mechanism having a plurality of discharge orifices for discharging a plurality of bars of stock, cutting mechanism for cutting off blocks of stock from said bars, a shaping roll having a plurality of shaping pits in its surface adapted to receive the blocks of stock after they are severed from the bars, smooth compressor rolls geared to said shaping roll, a ratchet wheel connected with said shaping roll, a rocker lever carrying a pawl for engagement with said ratchet, a driving shaft, a crank wheel thereon and a link connecting said rocker lever with the crank wheel.

13. In a device of the class described, the combination of a shaping roll, a rocking lever for imparting intermittent rotary movement to the shaping roll, a suitably driven crank wheel having a radial slot therein, an adjustable crank pin in said slot, means for securing the pin at any desired position in said slot and a link connecting the crank pin with the rocker lever.

14. In a device of the class described, the combination of an intermittently driven shaping roll, a toothed wheel connected therewith, and a movable stop mechanism arranged to be struck by said toothed wheel to jar the shaper roll.

15. In a device of the class described, the combination of a casing having a plurality of discharge orifices for discharging a plurality of bars of stock, feed worms in said casing having intermeshing pinions, a suitably operated knife for cutting off blocks of stock from said bars, a shaper roll having shaping pits in its surface arranged in alinement with the discharge orifices and adapted to receive the blocks of stock after they are severed from the bars, a driving shaft, suitable connections between the driving shaft and one of the intermeshing pinions, and suitable connections between the driving shaft and the shaping roll.

16. In a device of the class described, the combination of a casing having a plurality of discharge orifices, a plurality of feed worms in alinement with said orifices, intermeshing pinions upon said feed worms, gearing for driving said pinions, a knife for severing the material discharged from the orifices a shaping roll having pits arranged in alinement with the orifices and into which the severed material falls, and connections between said driving mechanism and shaping roll for imparting thereto an intermittent rotary movement.

17. In a device of the class described, the combination of a casing having a plurality of discharge orifices, feed worms in said casing, intermeshing pinions, upon said feed worms, suitable driving mechanism for rotating said pinions, a cutting knife, suitable connections between said cutting knife and driving mechanism for actuating said cutting knife, a shaping roll having pits into which the severed material falls and connection between the shaping roll and driving mechanism imparting to said shaping roll an intermittent rotary movement.

18. In a device of the class described, the combination of feeding mechanism having a plurality of discharge orifices for discharging a plurality of bars of stock, a suitably operated knife for cutting off blocks of stock from said bars, an intermittently rotated shaping roll having pits in its surface adapted to receive the blocks of stock after they are severed from the bars, driving mechanism, a conveyer belt, pulleys for supporting said conveyer belt, a ratchet wheel connected with one of said pulleys, an arm carrying a pawl for engagement with said ratchet wheel, an eccentric mounted upon the driving shaft, and a rod connecting said eccentric with said arm.

19. In a device of the class described, the combination of a suitably operated shaping roll having a plurality of pits on its periphery, a lubricating tank, a supply pipe, having a plurality of pet cocks for discharging a quantity of lubricant into said pits, and means for operating said pet cocks in unison.

20. In a device of the class described, the combination of feeding mechanism having a plurality of discharge orifices, a knife, a shaping roll having pits in its surface, a supply pipe for a lubricant having a series of pet cocks arranged over the shaping roll and in alinement with the uppermost row of pits, a bar for operating all of said pet cocks in unison, a bell crank lever, one arm of which is connected to said bar and an intermittently reciprocated rod connected to the other arm of said bell crank lever.

In witness whereof, I have executed the above application at Chicago, county of Cook and State of Illinois, this 22nd day of June 1908.

SPEERO POOLEY.

Witnesses:
C. F. DURLAND,
JOHN P. SCHU.